(12) United States Patent
Seo et al.

(10) Patent No.: US 11,351,840 B2
(45) Date of Patent: Jun. 7, 2022

(54) AIR CONDITIONER FOR VEHICLE

(71) Applicant: Hanon Systems, Daejeon (KR)

(72) Inventors: Yong Eun Seo, Daejeon (KR); Myoung Jun Kim, Daejeon (KR); Tae Wan Kim, Daejeon (KR); Jeong Hun Seo, Daejeon (KR); Jong Gon Lee, Daejeon (KR); Tae Gun Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 426 days.

(21) Appl. No.: 16/552,087

(22) Filed: Aug. 27, 2019

(65) Prior Publication Data
US 2020/0070625 A1    Mar. 5, 2020

(30) Foreign Application Priority Data
Aug. 30, 2018   (KR) ........................ 10-2018-0102501

(51) Int. Cl.
*B60H 1/00*   (2006.01)
*B60H 1/24*   (2006.01)

(52) U.S. Cl.
CPC ..... *B60H 1/00685* (2013.01); *B60H 1/00064* (2013.01); *B60H 1/244* (2013.01); *B60H 1/246* (2013.01); *B60H 2001/002* (2013.01)

(58) Field of Classification Search
CPC ............ B60H 1/00685; B60H 1/00064; B60H 1/244; B60H 1/246; B60H 2001/002
See application file for complete search history.

(56) References Cited

U.S. PATENT DOCUMENTS 7,857,041 B2 * 12/2010 Fukagawa .......... B60H 1/00842
                                                          165/202
7,950,444 B2 *  5/2011 Masatsugu ......... B60H 1/00842
                                                          165/42

FOREIGN PATENT DOCUMENTS

DE          19916992 A1 * 11/1999 ......... B60H 1/00685

* cited by examiner

*Primary Examiner* — Steven S Anderson, II
*Assistant Examiner* — Phillip Decker
(74) *Attorney, Agent, or Firm* — Dickinson Wright PLLC (57) ABSTRACT

Disclosed herein is an air conditioner for a vehicle, which can perform a bleeding function to discharge air to a rear seat floor vent in a rear seat vent mode, and optimize the size of an outlet and the shape of doors to adjust a bleeding amount of a rear seat floor. The air conditioner for a vehicle, which includes an air-conditioning case having an air passageway formed therein, and a heat exchanger for cooling and a heat exchanger for heating which are disposed in the air passageway of the air-conditioning case to exchange heat with air passing the air passageway, includes: a front seat temp door for adjusting the degree of opening between a front seat cold air passageway and a part of a warm air passageway; a first rear seat temp door arranged between the heat exchanger for cooling and the heat exchanger for heating to adjust the degree of opening of another part of the warm air passageway; and a rear seat mode door for adjusting the degree of opening of a rear seat air outlet, wherein the rear seat mode door has a rear seat closing function to close an air flow to a rear seat air outlet, and has a bypass part to bleed some of air.

9 Claims, 10 Drawing Sheets

FIG. 1

PRIOR ART

FIG. 2

PRIOR ART

FIG. 3

PRIOR ART

AIR CONDITIONER FOR VEHICLE

CROSS-REFERENCE TO RELATED APPLICATIONS

This application claims the benefit and priority of Korean Patent Application No. 10-2018-0102501, filed Aug. 30, 2018, the entire disclosure of which is incorporated herein by reference.

BACKGROUND OF THE INVENTION

Field of the Invention

The present invention relates to an air conditioner for a vehicle, and more particularly, to an air conditioner for a vehicle, which can send air-conditioned air toward a rear seat in order to perform front seat air-conditioning and rear seat air-conditioning of the vehicle.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

Figure 1:
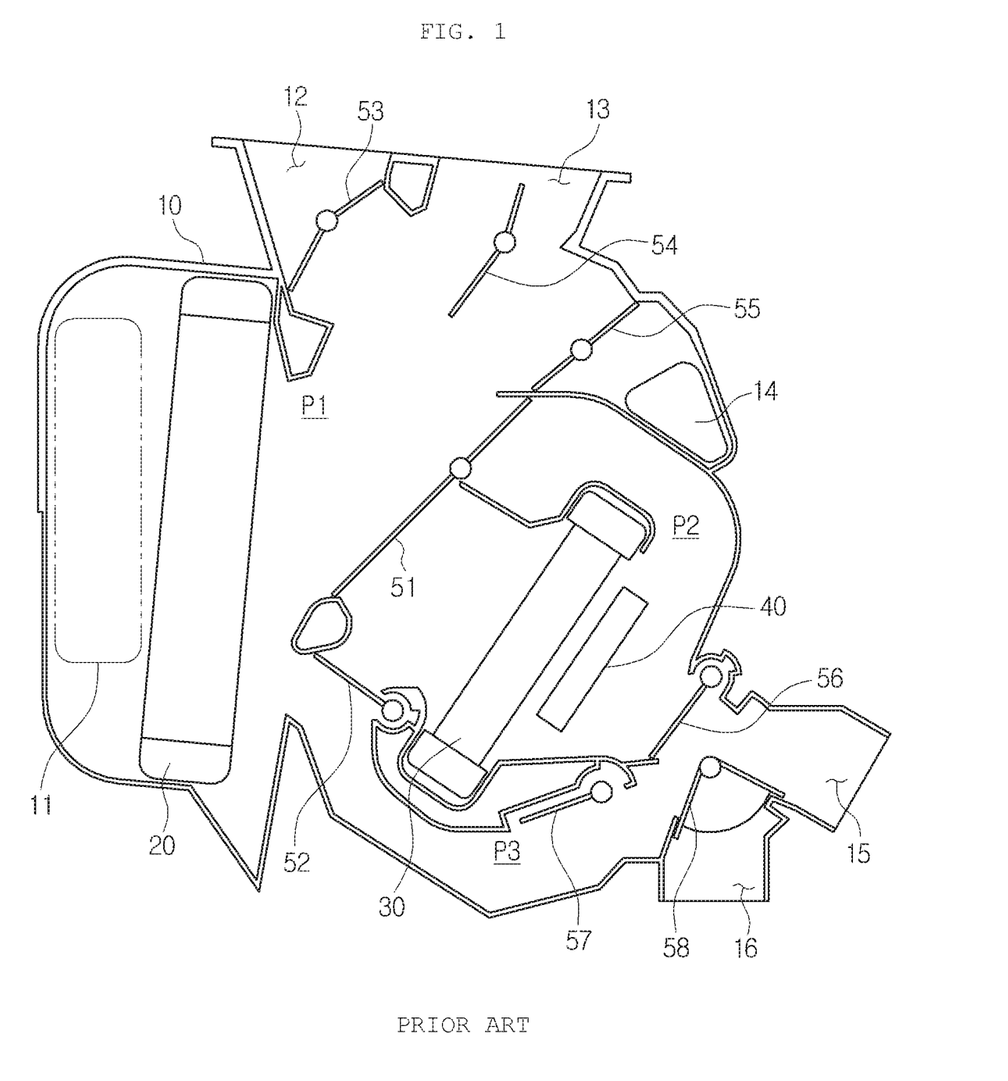
FIG. 1 is a sectional view of a conventional air conditioner for a vehicle.

Korean Patent No. 1484718 (Jan. 14, 2015) discloses an air conditioner for a vehicle which controls positions of a rear seat temp door, an auxiliary rear seat temp door and a rear seat on-off door to regulate an air volume of a rear seat. FIG. 1 is a sectional view of a conventional air conditioner for a vehicle. As shown in FIG. 1, the air conditioner for a vehicle includes an air-conditioning case 10, an evaporator 20, a heater core 30, a front seat temp door 51, and a front seat mode door.

The air-conditioning case 10 includes an air inlet 11 and an air outlet, and an air passageway formed therein. A blower unit is connected to the air inlet 11 so that indoor air or outdoor air is selectively introduced into the air passageway formed inside the air-conditioning case 10. The air outlet includes a defrost vent 12, a face vent 13, a floor vent 114, a rear seat face vent 15, and a rear floor vent 16. The air passageway inside the air-conditioning case 10 includes a front seat cold air passageway P1, a warm air passageway P2, and a rear seat cold air passageway P3.

The evaporator 20 is a heat exchanger for cooling and cools air passing the evaporator 20. The heater core 30 is a heat exchanger for heating and heats air passing the heater core 30. The heater core 30 is arranged in the warm air passageway P2 which is located downstream of the evaporator 20 in an air flow direction. An electric heater 40, such as a PTC heater, may be further disposed in the warm air passageway P2. The front seat temp door 51 is arranged between the evaporator 20 and the heater core 30 in order to adjust the degree of opening of the warm air passageway P2 passing the heater core 30 and the degree of opening of the cold air passageways P1 and P3 bypassing the heater core 30. The front seat mode door includes a defrost door 53, a vent door 54, and a floor door 55.

The rear seat air passageway includes the rear seat cold air passageway P3 that the air passing the evaporator 20 bypasses the heater core 30 and a warm air passageway passing the heater core 30. The warm air passageway of the rear seat air passageway is used together with the warm air passageway P2 of the front seat air passageway. That is, some of air passing the heater core 30 and flowing in the warm air passageway P2 moves upwardly, and then, is discharged to at least one among the defrost vent 12, the face vent 13, and the floor vent 114, and the remainder of the air moves downwardly, and then, is discharged to at least one among the rear seat face vent 15 and the rear seat floor vent 16. A rear seat mode door 58 is disposed in the rear seat air passageway to adjust the degree of opening of the rear seat face vent 15 and the degree of opening of the rear seat floor vent 16.

The air-conditioning case 10 has a rear seat temp door 52, an auxiliary rear seat temp door 56, and a rear seat on-off door 57 which are disposed in the air-conditioning case 10. The rear seat temp door 52 is disposed between the evaporator 20 and the heater core 30 in order to adjust the degree of opening of a passageway flowing to the warm air passageway P2 and a passageway flowing to the rear seat cold air passageway P3. The auxiliary rear seat temp door 56 is arranged downstream of the heater core 30 in the air flow direction in order to adjust the degree of opening of a passageway flowing to a rear seat air outlet. The rear seat on-off door 57 adjusts the degree of opening of the rear seat cold air passageway P3.

Figure 2:
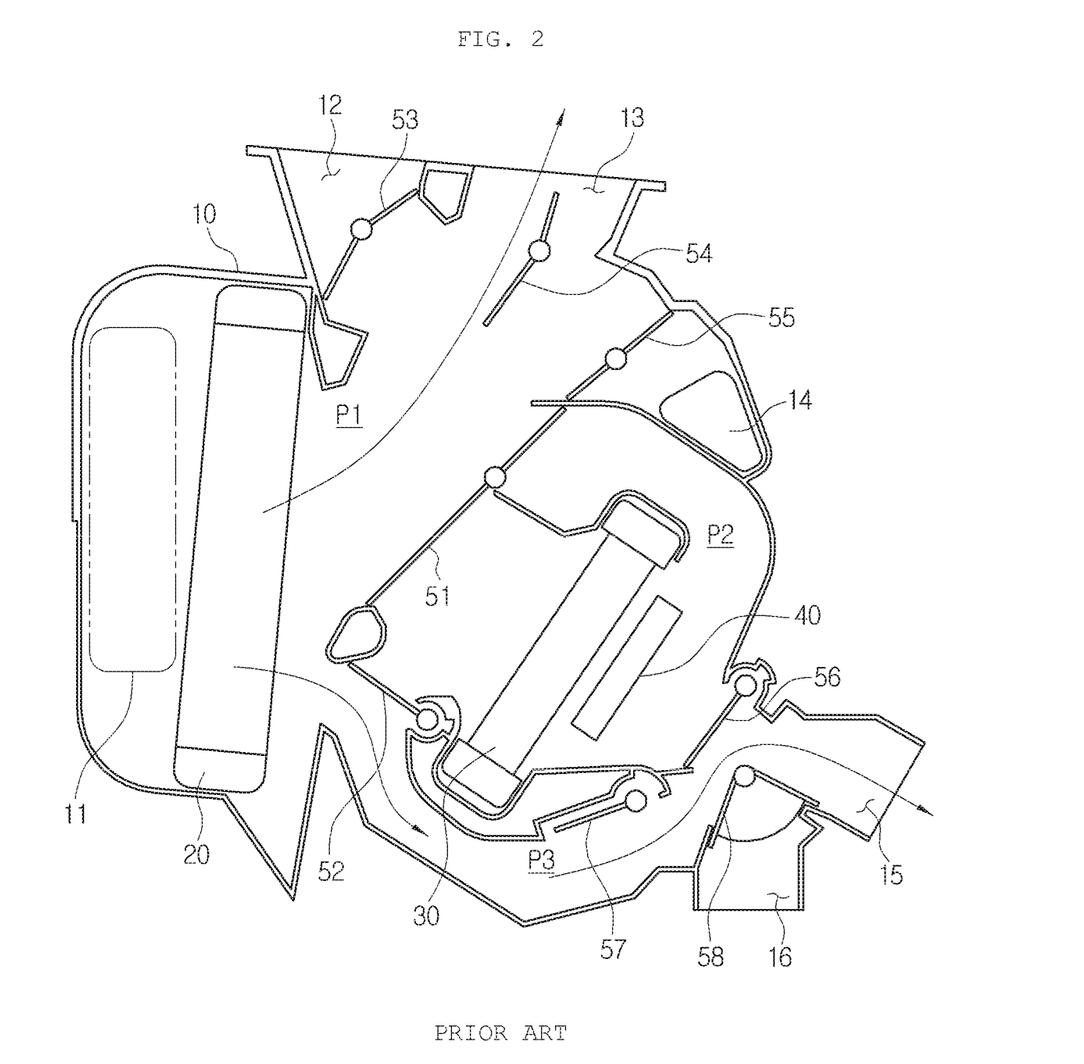
FIG. 2 is a view showing a front and rear seat cooling mode of the conventional air conditioner for a vehicle.

FIG. 2 is a view showing a front and rear seat cooling mode of the conventional air conditioner for a vehicle. Referring to FIG. 2, in the front and rear seat cooling mode, the front seat temp door 51 closes the warm air passageway P2 and opens the front seat cold air passageway P1, and the rear seat temp door 52 closes the warm air passageway P2 and opens the rear seat cold air passageway P3. The auxiliary rear seat temp door 56 closes a passageway flowing to the rear seat air outlet, and the rear seat on-off door 57 opens the rear seat cold air passageway P3. The air cooled while passing the evaporator 20 bypasses the heater core 30, and then, some of the air passes through the front seat cold air passageway P1 and is discharged to at least one among the front seat air outlets, and the rest of the air passes through the rear seat cold air passageway P3 and is discharged to at least one among the rear seat air outlets.

Figure 3:
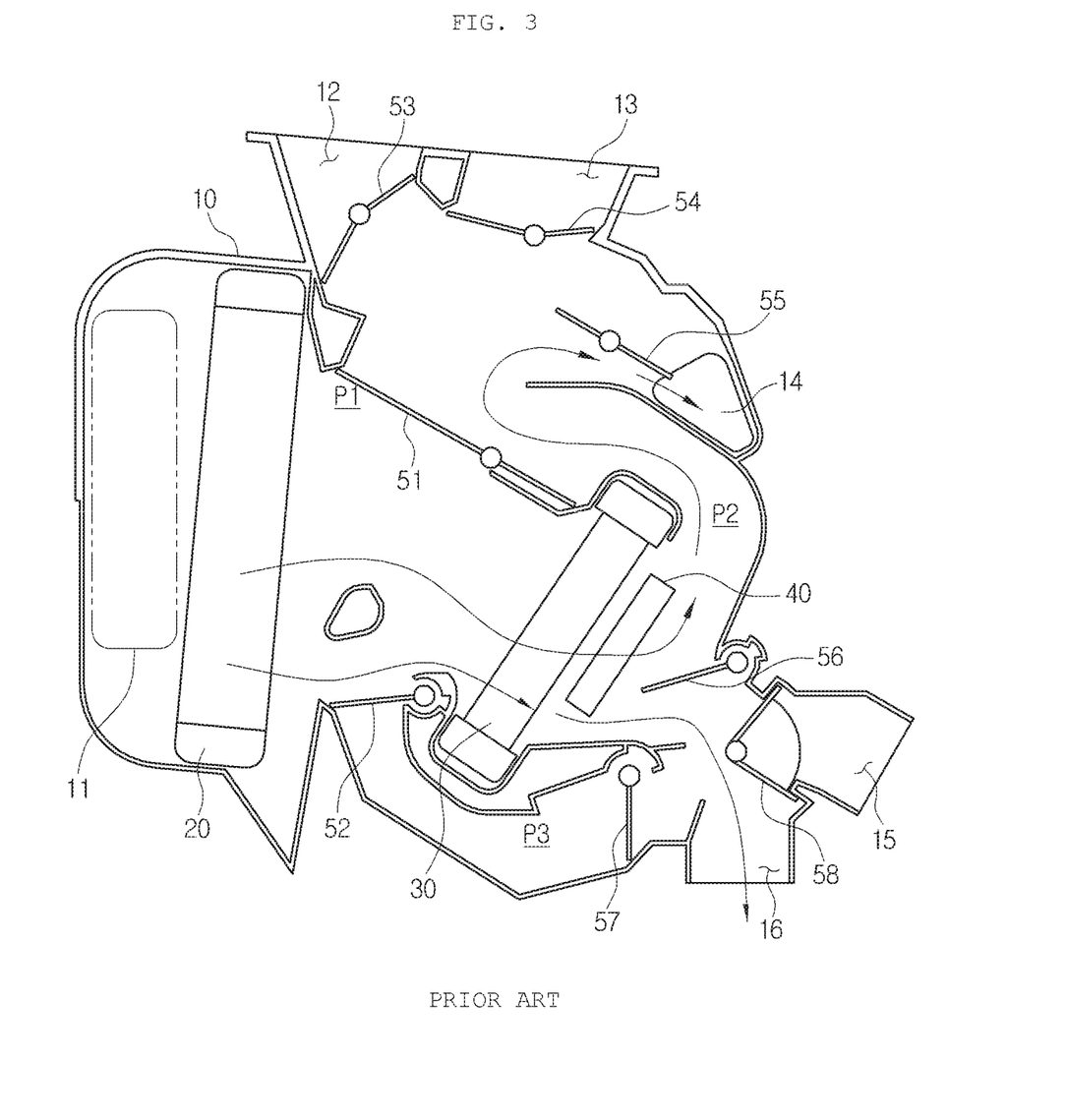
FIG. 3 is a view showing a front and rear seat heating mode of conventional air conditioner for a vehicle.

FIG. 3 is a view showing a front and rear seat heating mode of the conventional air conditioner for a vehicle. Referring to FIG. 3, in the front and rear seat heating mode, the front seat temp door 51 closes the front seat cold air passageway P1 and opens the warm air passageway P2, and the rear seat temp door 52 closes the rear seat cold air passageway P3 and opens the warm air passageway P2. The auxiliary rear seat temp door 56 opens the passageway flowing to the rear seat air outlet, and the rear seat on-off door 57 closes the rear seat cold air passageway P3. The air passed through the evaporator 20 is heated while passing the heater core 30, and then, some of the heated air moves upwards and is discharged to at least one among the front seat air outlets, and the rest of the heated air moves downwards and is discharged to at least one among the rear seat air outlets.

The conventional air conditioner for a vehicle can control ON and OFF modes of air-conditioning of the rear seat depending on positions of the rear seat temp door 52 and the rear seat on-off door 57, and the rear seat mode door 58 is used just for adjusting the rear seat mode. The conventional air conditioner for a vehicle has a disadvantage in that the number of components is increased since the air conditioner must include two temp doors 52 and 56, one on-off door 57 and one mode door 58 in order to control air-conditioning of the rear seat.

Additionally, the conventional air conditioner for a vehicle has several disadvantages in that its structure is complicated and it is difficult to perform a bleeding function, which discharges air toward the rear seat floor vent in the rear seat vent mode, in order to realize various air-conditioning modes, such as a rear seat vent mode, a rear seat bi-level mode, a rear seat floor mode, and a rear seat close mode.

PATENT LITERATURE

Patent Documents

Patent Document: Korean Patent No. 1484718 (Jan. 14, 2015)

SUMMARY OF THE INVENTION

Accordingly, the present invention has been made to solve the above-mentioned problems occurring in the prior arts, and it is an object of the present invention to provide an air conditioner for a vehicle which can reduce the number of doors, realized various air-conditioning modes and optimize control of doors by modes, and does not deteriorate air-conditioning performance.

It is another object of the present invention to provide an air conditioner for a vehicle which can perform a bleeding function to discharge air toward a rear seat floor vent in a rear seat vent mode, and optimize the size of an outlet and the shape of doors to adjust a bleeding amount of a rear seat floor.

To accomplish the above object, according to the present invention, there is provided an air conditioner for a vehicle which includes an air-conditioning case having an air passageway formed therein, and a heat exchanger for cooling and a heat exchanger for heating which are disposed in the air passageway of the air-conditioning case to exchange heat with air passing the air passageway, further including: a front seat temp door for adjusting the degree of opening between a front seat cold air passageway and a part of a warm air passageway; a first rear seat temp door arranged between the heat exchanger for cooling and the heat exchanger for heating to adjust the degree of opening of another part of the warm air passageway; and a rear seat mode door for adjusting the degree of opening of a rear seat air outlet, wherein the rear seat mode door has a rear seat closing function to close an air flow to a rear seat air outlet, and has a bypass part to bleed some of air.

Moreover, the rear seat mode door has a stepped portion formed at an end portion.

Furthermore, the rear seat mode door is a dome-shaped door and the air-conditioning case has a protrusion portion corresponding to the stepped portion, so as to perform a bleeding function through a gap formed between the protrusion portion and the stepped portion.

Additionally, the protrusion portion passes the stepped portion of the rear seat mode door to make rotation of the rear seat mode door free, and is caught to another end portion of the opposite side of the stepped portion of the rear seat mode door to restrict the rotation of the rear seat mode door.

In addition, the stepped portion extends from both sides of the rear seat mode door in an axial direction to a predetermined length.

Moreover, the air conditioner for a vehicle further includes a second rear seat temp door arranged downstream of the heat exchanger for heating to adjust the degree of opening between the warm air passageway and a rear seat cold air passageway, wherein the rear seat mode door is arranged downstream of the second rear seat temp door.

Furthermore, in a rear seat vent mode, the rear seat mode door bleeds some of the air through the rear seat floor vent.

Moreover, the rear seat cold air passageway communicates with the rear seat floor vent 116 and the rear seat face vent through a communication hole, and the communication hole, the rear seat floor vent and the rear seat face vent are formed in the air-conditioning case in order along a rotational radius of the rear seat mode door, and the protrusion portion is formed at a lower portion of the communication hole.

Additionally, in the rear seat vent mode, the other end portion of the stepped portion gets in contact with the air-conditioning case to be sealed, and the end portion where the stepped portion is formed is located on the protrusion portion to form the gap between the protrusion portion and the stepped portion (230).

In addition, in a rear seat floor mode or in a rear seat closing mode, all of the other end portion of the opposite side of the stepped portion and the end portion where the stepped portion is formed get in contact with the air-conditioning case to be sealed.

Moreover, the rear seat mode door has a rear seat closing function to close the air flow to the rear seat air outlet.

Furthermore, in the rear seat off mode, the stepped portion of the rear seat mode door faces an upper sealing surface of the air-conditioning case and closes a space between the air-conditioning case and the stepped portion.

In another aspect of the present invention, there is provided an air conditioner for a vehicle which includes an air-conditioning case having an air passageway formed therein, and a heat exchanger for cooling and a heat exchanger for heating which are disposed in the air passageway of the air-conditioning case to exchange heat with air passing the air passageway, further including: a front seat temp door for adjusting the degree of opening between a front seat cold air passageway and a part of a warm air passageway; a first rear seat temp door arranged between the heat exchanger for cooling and the heat exchanger for heating to adjust the degree of opening of another part of the warm air passageway; and a rear seat mode door for adjusting the degree of opening of a rear seat air outlet, wherein the rear seat mode door is a rotary type door and has sealing parts formed at both ends of a door plate, and the height of one of the sealing parts is different from the height of the other one.

The air conditioner for a vehicle according to the present invention can reduce the number of doors, realized various air-conditioning modes and optimize control of doors by modes, and does not deteriorate air-conditioning performance, thereby reducing a load and a manufacturing cost of the air conditioner.

Additionally, the air conditioner for a vehicle according to the present invention can perform a bleeding function to discharge air toward a rear seat floor vent in a rear seat vent mode, and optimize the size of an outlet and the shape of doors to adjust a bleeding amount of a rear seat floor.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, with reference to the attached drawings, technical structure and configuration of an air conditioner for a vehicle according to a preferred embodiment of the present invention will be described in detail.

Figure 4:
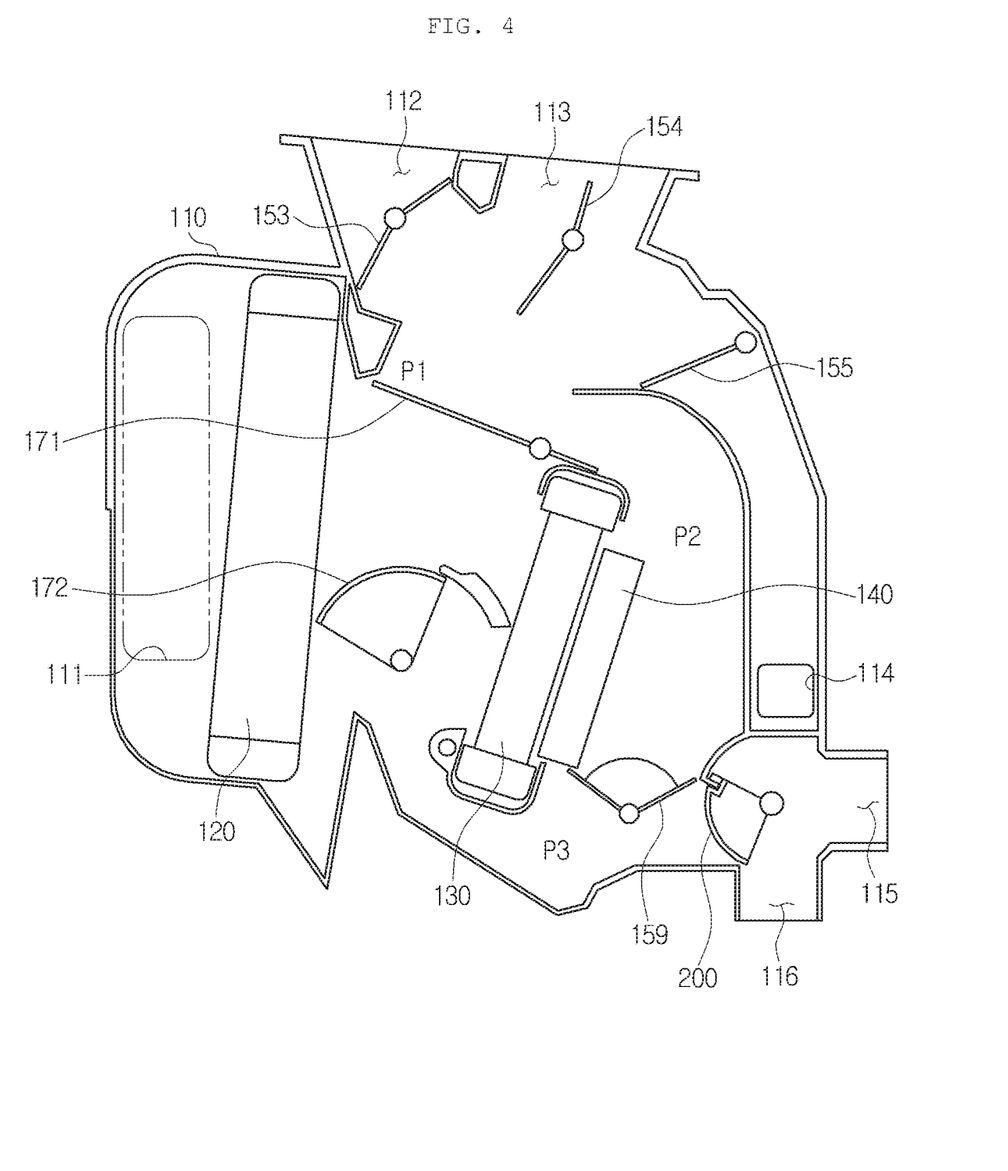
FIG. 4 is a sectional view of an air conditioner for a vehicle according to a preferred embodiment of the present invention.

FIG. 4 is a sectional view of an air conditioner for a vehicle according to a preferred embodiment of the present invention. As shown in FIG. 4, the air conditioner for a vehicle according to the preferred embodiment of the present invention includes: an air-conditioning case 110 having an air passageway formed therein; and a heat exchanger for cooling and a heat exchanger for heating disposed in the air passageway of the air-conditioning case 110 to exchange heat with air passing the air passageway.

The air-conditioning case 110 includes an air inlet 111, air outlets, and the air passageway formed therein. A blower unit is connected to the air inlet 111 so that indoor air or outdoor air are selectively introduced into the air passageway of the air-conditioning case 110. The air outlets are a front seat air outlet having a defrost vent 112, a front seat face vent 113 and a front seat floor vent 114, and a rear seat air outlet having a rear seat face vent 115 and a rear seat floor vent 116.

The heat exchanger for cooling is an evaporator 120. The evaporator 120 cools air by exchanging heat between refrigerant flowing in the evaporator 120 and air passing the evaporator 120. The heat exchanger for heating is a heater core 130. The heater core 130 heats air by exchanging heat between cooling water flowing in the heater core 130 and air passing the heater core 130. The heater core 130 is arranged in a warm air passageway P2, which is located downstream of the evaporator 120 in an air flow direction. An electric heater 140, such as a PTC heater, may be further disposed in the warm air passageway P2.

The air passageway in the air-conditioning case 110 includes a front seat cold air passageway P1, a warm air passageway P2, and a rear seat cold air passageway P3. The air passageway downstream of the evaporator 120 is divided into the front seat cold air passageway P1, the warm air passageway P2, and the rear seat cold air passageway P3. The front seat cold air passageway P1, the warm air passageway P2, and the rear seat cold air passageway P3 are formed in order from top to bottom, and the warm air passageway P2 formed vertically is arranged between the front seat cold air passageway P1 and the rear seat cold air passageway P3.

The air passing the evaporator 120 flows to the front seat cold air passageway P1 and the rear seat cold air passageway P3 after bypassing the heater core 130 of the warm air passageway P2 to, or joins the front seat cold air passageway P1 or the rear seat cold air passageway P3.

The front seat cold air passageway P1 is a passage that the air passing the evaporator 120 flows toward the front seat of the vehicle after bypassing the heater core 130. The rear seat cold air passageway P3 is a passage that the air passing the evaporator 120 flows toward the rear seat of the vehicle after bypassing the heater core 130. The warm air passageway P2 is a passage that the air passing the evaporator 120 flows toward the front seat or the rear seat of the vehicle after passing the heater core 130.

The air-conditioning case 110 has a front seat air outlet for discharging air toward the front seat of the vehicle, and the front seat air outlet is controlled in the degree of opening by a front seat mode door. The front seat mode door includes a defrost door 153 for adjusting the degree of opening of the defrost vent 112, a vent door 154 for adjusting the degree of opening of the front seat face vent 113, and a floor door 155 for adjusting the degree of opening of the front seat floor vent 114. Moreover, the air-conditioning case 110 has a rear seat air outlet for discharging air toward the rear seat of the vehicle, and the rear seat air outlet is controlled in the degree of opening by the rear seat mode door 200.

The air conditioner for a vehicle has a front seat temp door 171. The front seat temp door 171 adjusts the degree of opening between a part of the front seat cold air passageway P1 and a part of the warm air passageway P2. The front seat temp door 171 is adjacent to downstream of the evaporator 120 and is located at a boundary where the front seat cold air passageway P1 and the warm air passageway P2 branch off. The front seat temp door 171 is a tail door having plate members formed at both sides around a rotary shaft in a radial direction.

The front seat temp door 171 has a rotary shaft, a first door part, and a second door part. The rotary shaft of the front seat temp door 171 is mounted adjacent to a lower end of an outlet of the warm air passageway P2. The first door part is formed at one side around the rotary shaft to adjust the degree of opening of upper parts of inlets of the cold air passageway P1 and the warm air passageway P2. The second door is formed at the other side around the rotary shaft to adjust the degree of opening of a front seat outlet of the warm air passageway P2.

The air conditioner for a vehicle according to the first preferred embodiment of the present invention is to control temperature of three independent zones of the driver's seat, the front passenger's seat, and the rear seat, and includes three doors for controlling temperature of the rear seat. That is, the air conditioner for a vehicle includes a first rear seat temp door 172, a second rear seat temp door 159, and the rear seat mode door 200.

The first rear seat temp door 172 is arranged between the evaporator 120 and the heater core 130 to adjust the degree of opening of the other part of the warm air passageway P2. That is, the first rear seat temp door 172 adjusts the degree of opening of a lower part of an inlet of the warm air passageway P2 which is not covered by the front seat temp door 171.

The second rear seat temp door 159 is arranged downstream of the heater core 130, and adjusts the degree of opening of the warm air passageway P2 and the rear seat cold air passageway P3. The second rear seat temp door 159 is a dome door type. The warm air passageway P2 and the rear seat cold air passageway P3 downstream of the heater core 130 are communicated with each other. The second rear seat temp door 159 is arranged in a communication path between the warm air passageway P2 and the rear seat cold air passageway P3 downstream of the heater core 130. That is, the second rear seat temp door 159 adjusts the degree of opening of the communication path between the warm air passageway P2 and the cold air passageway P3 and the rear seat cold air passageway P3.

The rear seat mode door 200 is arranged downstream of the second rear seat temp door 159 to adjust the degree of opening of the rear seat air outlet. The rear seat mode door 200 is a dome-shaped door. The rear seat mode door 200 adjusts the degree of opening between the rear seat air passageway, the console vent 115, and the rear seat floor vent 116.

That is, the rear seat mode door 200 is rotated in the counterclockwise direction to the maximum in FIG. 4 to close the rear seat air passageway, is rotated in the clockwise direction at a predetermined angle to close the rear seat floor vent 116 and open the rear seat face vent 115, is rotated in the clockwise direction to the maximum to close the rear seat face vent 115 and open the rear seat floor vent 116, or is located midway between the rear seat face vent 115 and the rear seat floor vent 116 to open all of the two vents.

The air conditioner for a vehicle controls temperature of the rear seat using the first rear seat temp door 172 and the second rear seat temp door 159. Furthermore, the air conditioner for a vehicle controls opening (on) and closing (off) of the rear seat air passageway using the rear seat mode door 200. As described above, compared with the conventional air conditioner, the air conditioner for a vehicle according to the present invention can realize a three-zone air conditioner which can reduce the number of doors and perform control of the rear seat air-conditioning smoothly. Therefore, the air conditioner for a vehicle according to the present invention can reduce the number of the components, manufacturing costs, and weight and volume of the air conditioner.

Under the condition that the rear seat mode door 200 closes the rear seat air passageway, the rear seat mode door 200 changes the position of the first rear seat temp door 172 according to front seat conditions. In detail, when the rear seat mode door 200 closes the rear seat air passageway, under a condition that the front seat temp door 171 is under a condition of a maximum cooling mode of the front seat, the first rear seat temp door 172 is in a maximum cooling mode of the rear seat.

Moreover, when the rear seat mode door 200 closes the rear seat air passageway, if the front seat temp door 171 is not under the condition of the maximum cooling mode of the front seat, the first rear seat temp door 172 is in the maximum heating mode of the rear seat. In this instance, the case that the front seat temp door 171 is not under the condition of the maximum cooling mode of the front seat means that the front seat temp door 171 is in the maximum heating mode or in a mixing mode.

As described above, due to the structure to change the position of the first rear seat temp door 172 according to the front seat conditions, all the air is guided to flow to the warm air passageway P2 and performance of the heater core 130 of the front seat can be maximized so as to enhance heating performance.

The first rear seat temp door 172 is a dome-shaped door. The first rear seat temp door 172 is located to close the warm air passageway P2 under the condition of the maximum cooling mode, and is located to partition the evaporator 120 and the heater core 130 under the condition of the maximum heating mode.

That is, if the first rear seat temp door 172 is not under the condition of the maximum cooling mode of the front seat, the inside of the dome shape of the first rear seat temp door 172 guides air toward the warm air passageway P2. Due to the above structure, the air passing the evaporator 120 is smoothly guided toward the heater core 130 of the warm air passageway P2 by the inside of the streamlined dome shape.

The first rear seat temp door 172 is formed to always open the rear seat cold air passageway P3. That is, the first rear seat temp door 172 does not perform the on-off action of the rear seat cold air passageway P3 but performs the opening and closing function of the warm air passageway P2 and an air guiding function in order to enhance performance of the heater core. Furthermore, the on-off action of the rear seat cold air passageway P3 is performed by the rear seat mode door 200, so that the air conditioner can reduce the number of doors and smoothly perform the on-off action for the rear seat air-conditioning.

In the meantime, the first rear seat temp door 172 and the second rear seat temp door 158 are controlled to adjust temperature of the rear seat. That is, in the maximum cooling mode, the first rear seat temp door 172 closes the warm air passageway P2, and the second rear seat temp door 159 closes the communication path between the warm air passageway P2 and the rear seat cold air passageway P3 downstream of the heater core 130. Moreover, in the maximum heating mode, the dome-shaped inner face of the first rear seat temp door 172 is located to guide air toward the warm air passageway P2, and the second rear seat temp door 159 is located to close the rear seat cold air passageway P3. Furthermore, in the mixing mode, the dome-shaped inner face of the first rear seat temp door 172 is located to guide the air toward the warm air passageway P2, and the second rear seat temp door 159 is located between the communication path, which is located between the warm air passageway P2 and the rear seat cold air passageway P3 downstream of the heater core 130, and the rear seat cold air passageway P3.

Figure 5:
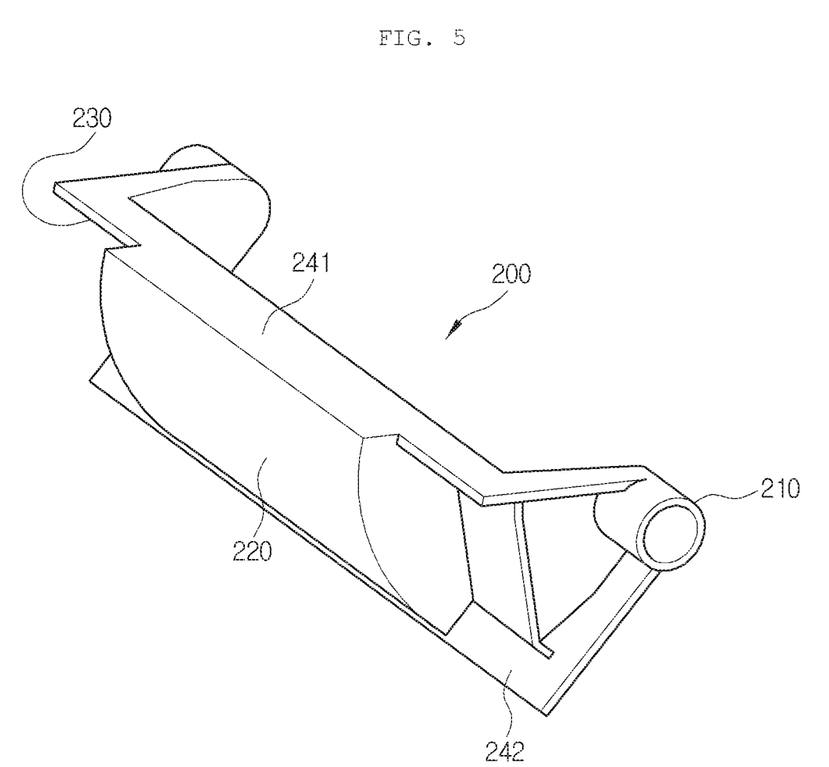
FIG. 5 is a perspective view showing a rear seat mode door according to the preferred embodiment of the present invention.
Figure 6:
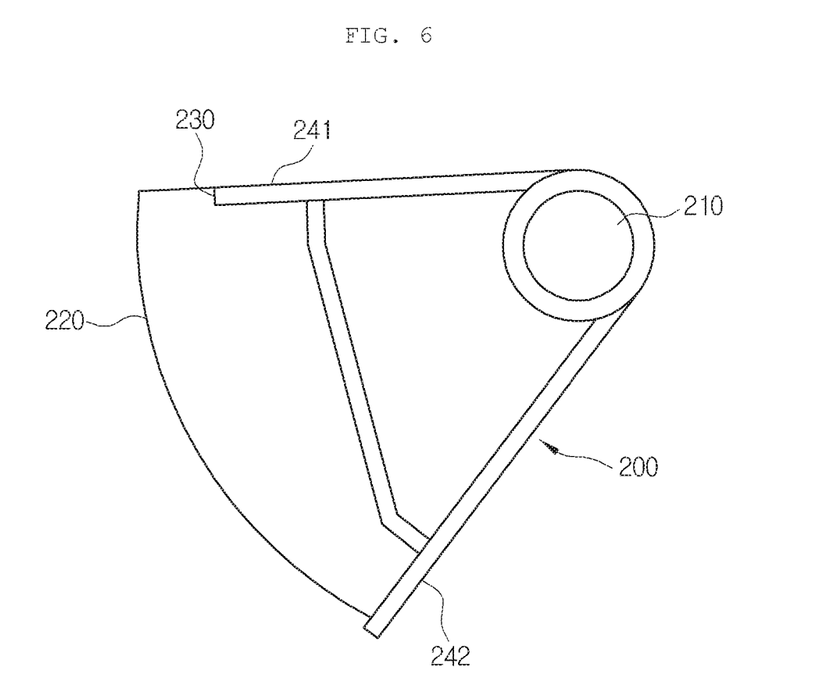
FIG. 6 is a side view showing the rear seat mode door according to the preferred embodiment of the present invention.
Figure 7:
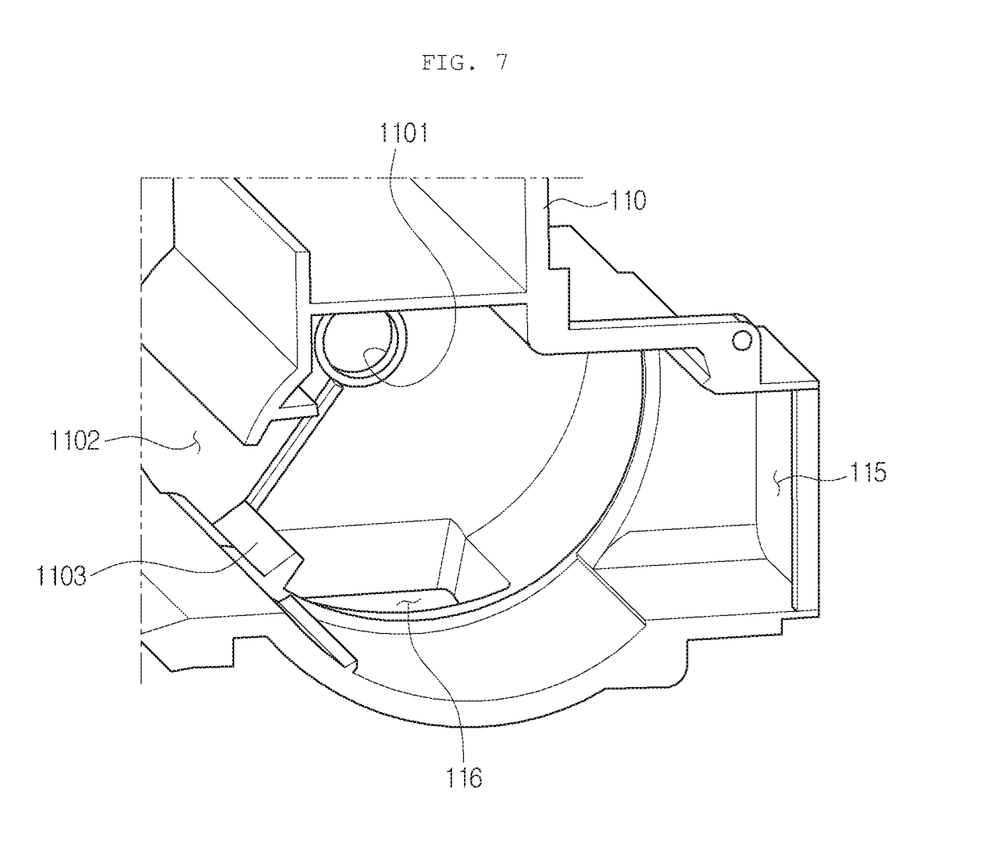
FIG. 7 is a perspective view showing the inside of an air-conditioning case from which the rear seat mode door is separated according to the preferred embodiment of the present invention.
Figure 8:
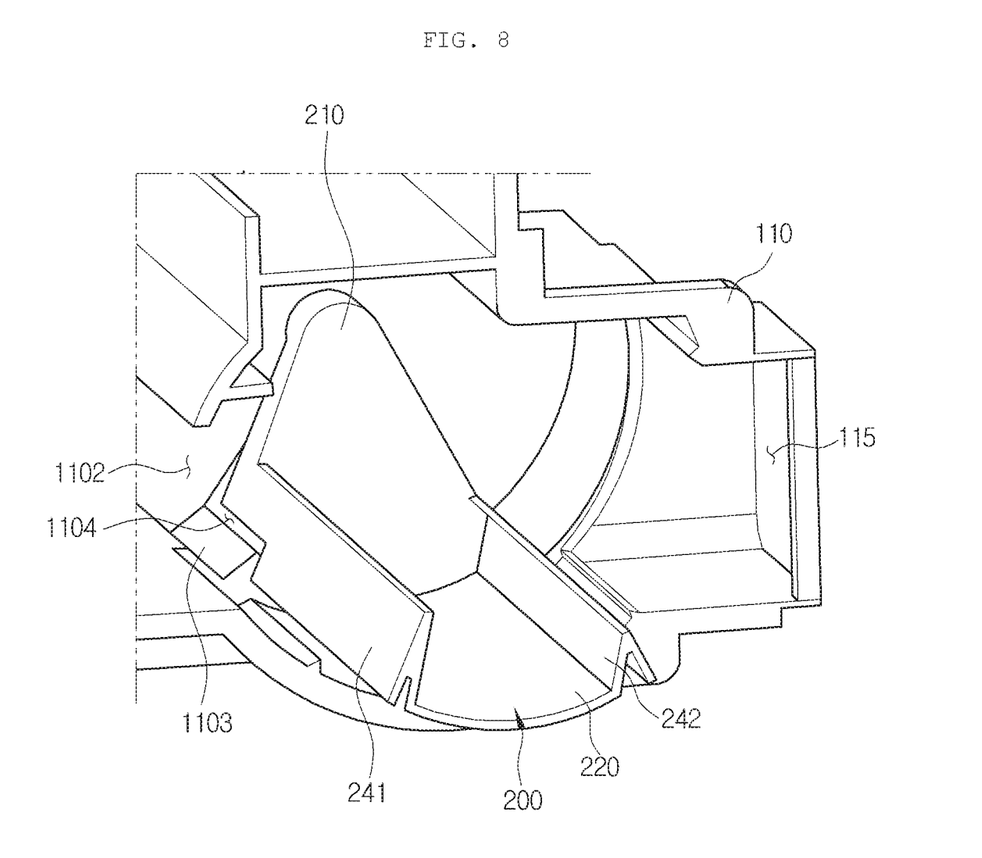
FIG. 8 is a perspective view showing a state where the rear seat mode door is combined to the air-conditioning case.

FIG. 5 is a perspective view showing a rear seat mode door according to the preferred embodiment of the present invention, FIG. 6 is a side view showing the rear seat mode door according to the preferred embodiment of the present invention, FIG. 7 is a perspective view showing the inside of an air-conditioning case from which the rear seat mode door is separated according to the preferred embodiment of the present invention, and FIG. 8 is a perspective view showing a state where the rear seat mode door is combined to the air-conditioning case.

Referring to FIGS. 5 to 8, the rear seat mode door 200 has a rear seat closing function to close an air flow toward the rear seat air outlet. Moreover, the rear seat mode door 200 has a bypass art to bleed some of the air. In more detail, the rear seat mode door 200 has a stepped portion 230 formed at an end portion 241. The air-conditioning case 110 has a protrusion portion 1103 corresponding to the stepped portion 230. So, the rear seat mode door 200 can perform the bleed function through a gap 1104 formed between the protrusion portion 1103 and the stepped portion 230.

The protrusion portion 1103 penetrates through the stepped portion 230 of the rear seat mode door 200 to make rotation of the rear seat mode door 200 free, and is caught to an end portion 242 of the opposite side of the stepped portion 230 of the rear seat mode door 200 to restrict rotation of the rear seat mode door 200. The stepped portion 230 extends from both sides of the rear seat mode door 200 in an axial direction to a predetermined length.

Not shown, but a separator is disposed in the middle of the width of the air-conditioning case 110 in order to independently perform air-conditioning of right and left spaces of the vehicle in the width direction. As shown in FIG. 7, the rear seat floor vents 116 are formed at the right and left sides of the air-conditioning case 110 in the width direction, and the rear seat face vent 115 is formed at the central part of the air-conditioning case 110.

The rear seat cold air passageway P3 communicates with the rear seat floor vent 116 and the rear seat face vent 115 through a communication hole 1102. The communication hole 1102, the rear seat floor vents 116, and the rear seat face vent 115 are formed in the air-conditioning case 110 in order in the counterclockwise direction along the rotational radius of the rear seat mode door 200. The communication hole 1102, the rear seat floor vents 116, and the rear seat face vent 115 are arranged radially on the basis of a rotary shaft 210 of the rear seat mode door 200. The protrusion portion 1103 is formed at a lower portion of the communication hole 1102.

In the rear seat vent mode, the rear seat mode door 200 bleeds some of the air through the rear seat floor vent 116. That is, in the rear seat vent mode, the end portion 242 at the opposite side of the stepped portion 230 gets in contact with the air-conditioning case 110 to be sealed, and another end portion 241 where the stepped portion 230 is formed is located at the protrusion portion 1103 to form the gap 1104 between the protrusion portion 1103 and the stepped portion 230.

In the meantime, in the rear seat floor mode or in the rear seat closing mode, all of the end portion 242 at the opposite side of the stepped portion 230 and the other end portion 241 where the stepped portion 230 is formed get in contact with the air-conditioning case 110 and are sealed.

The rear seat mode door 200 is a rotary door type. In more detail, the rear seat mode door 200 is mounted in the air-conditioning case 110 to rotate around the rotary shaft 210, and is a fan-shaped dome door having a dome part 220 spaced apart from the rotary shaft 210 in a radial direction.

The dome part 220 of the rear seat mode door 200 extends from the end portion 241 to the other end portion 242 in the rotation direction. The dome part 220 acts as a partition wall to block the flow of the air by stopping the air passageway or the vent outlet. Furthermore, a space between the rotary shaft 210 and the dome part 220 is a passageway in which the air flows.

The rear seat mode door 200 is disposed in a rotation chamber formed downstream of the second rear seat temp door 159 of the rear seat air passageway in the air-conditioning case 110. The rotation chamber formed to correspond to the shape of the rear seat mode door 200 surrounds a round inner wall of the dome-shaped rear seat mode door 200 in order to guide the rotation of the rear seat mode door 200. The communication hole 1102, the rear seat floor vent 116 and the rear seat face vent 115 are formed in the partition wall of the rotation chamber in order in the counterclockwise direction.

The communication hole 1102 is formed downstream of the second rear seat temp door 159, and is an air inlet of the rotation chamber. The air introduced into the rotation chamber through the communication hole 1102 is discharged to at least one among the rear seat floor vent 116 and the rear seat face vent 115. The rotation chamber has a rotation hole 1101 into which the rotary shaft 210 of the rear seat mode door 200 is inserted.

The protrusion portion 1103 extends from both sides to a predetermined length in the axial direction (in the width direction of the vehicle) to correspond to the stepped portion 230 of the rear seat mode door 200. The protrusion portion 1103 is formed to be minutely shorter than the stepped portion 230 in the radial direction. That is, as shown in FIG. 8, if the stepped portion 230 is located at the protrusion portion 1103, a fine gap 1104 is formed between the stepped portion 230 and the protrusion portion 1103 to perform the bleeding function of air through the gap 1104.

Additionally, the other end portion 242 of the rear seat mode door 200 does not have the stepped portion. So, if the other end portion 242 is located at the protrusion portion 1103, the protrusion portion 1103 acts as a stopper for restricting the rotation of the rear seat mode door 200, and the air is not discharged to the rear seat floor vent 116 since there is no gap between the protrusion portion 1103 and the rear seat mode door 200.

That is, the rear seat mode door 200 has sealing parts formed at both ends of a door plate. In this instance, the height of one of the sealing parts is different from the height of the other one. That is, the sealing part where the stepped portion 230 is formed is shorter than the sealing part where the stepped portion is not formed.

In a rear seat off mode, the stepped portion 230 of the rear seat mode door 200 faces an upper sealing surface of the air-conditioning case 110 to close a space between the air-conditioning case 110 and the stepped portion 230. The sealing part where the stepped portion 230 is formed performs the bypass function (bleeding function) if it is located on a lower sealing surface of the air-conditioning case 110, namely, the sealing surface where the protrusion portion 1103 is formed. However, if the sealing part where the stepped portion 230 is formed is located on the upper sealing surface, the flow channel is closed so that the bleeding function is not performed in the rear seat off mode.

Figure 9:
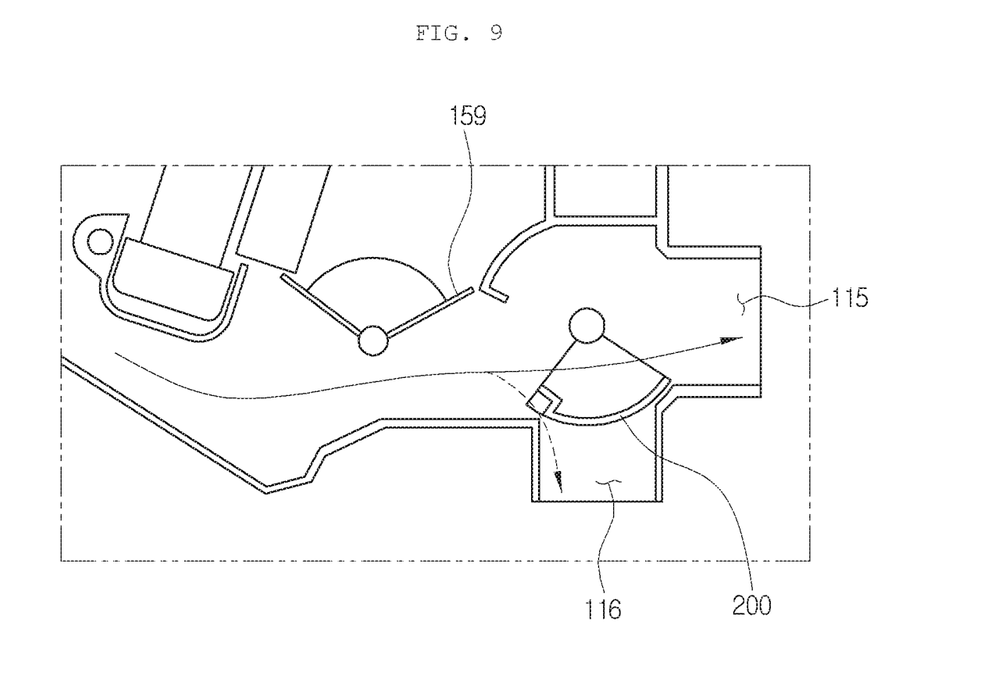
FIG. 9 is a view showing a rear seat vent mode of the air conditioner for a vehicle according to the preferred embodiment of the present invention.

FIG. 9 is a view showing a rear seat vent mode of the air conditioner for a vehicle according to the preferred embodiment of the present invention.

Referring to FIG. 9, some of the air passing the evaporator 120 is discharged to the front seat face vent 113 through the front seat cold air passageway P1, and the other air is discharged to the rear seat face vent 115 through the rear seat cold air passageway P3. The front seat temp door 171 and the first rear seat temp door 172 all close the warm air passageway P2, and the second rear seat temp door 159 closes the communication path between the warm air passageway P2 and the rear seat cold air passageway P3. In addition, the rear seat mode door 200 closes the rear seat floor vent 116, and connects the rear seat air passageway and the rear seat face vent 115 with each other.

In this instance, the stepped portion 230 of the rear seat mode door 200 is located on the protrusion portion 1103 so that the air bypasses through the gap 1104 between the stepped portion 230 and the protrusion portion 1103 and is bled through the rear seat floor vent 116 as shown by a dotted line of FIG. 9.

Figure 10:
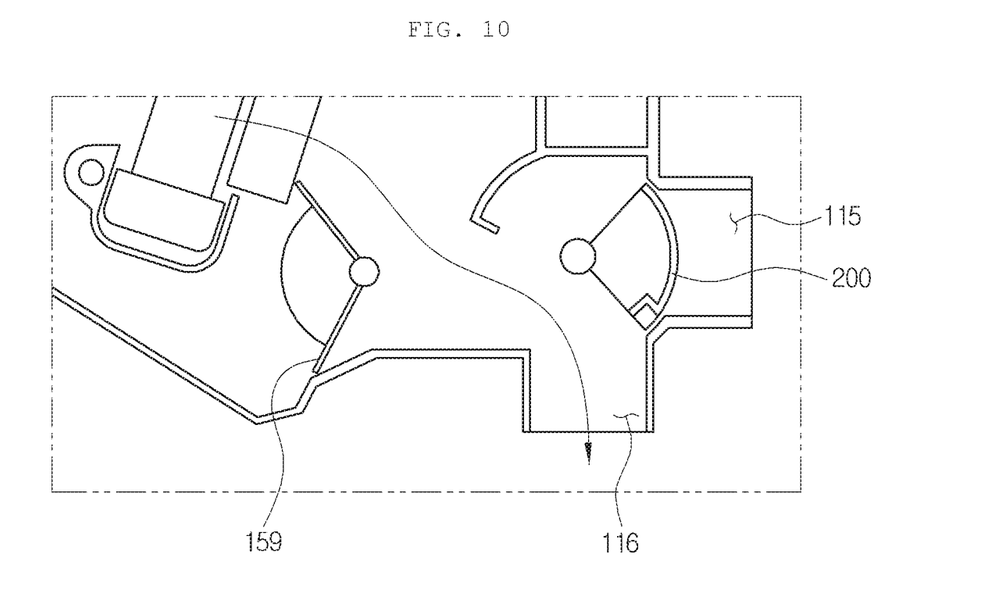
FIG. 10 is a view showing a rear seat floor mode of the air conditioner for a vehicle according to the preferred embodiment of the present invention.

FIG. 10 is a view showing a rear seat floor mode of the air conditioner for a vehicle according to the preferred embodiment of the present invention.

Referring to FIG. 10, the air passing the evaporator 120 flows to the warm air passageway P2 and passes the heater core 130 and the electric heater 140. After that, some of the air is discharged to the front seat floor vent 114, and the other air is discharged to the rear seat floor vent 116 through the communication path between the warm air passageway P2 and the rear seat cold air passageway P3. All of the front seat temp door 171 and the first rear seat temp door 172 open the warm air passageway P2, and the second rear seat temp door 159 closes the rear seat cold air passageway P3 and opens the communication path between the warm air passageway P2 and the rear seat cold air passageway P3. Moreover, the rear seat mode door 200 closes the rear seat face vent 115 and connects the rear seat air passageway and the rear seat floor vent 116 with each other.

In this instance, the stepped portion 230 and the other end portion 242 of the rear seat mode door 200 are stopped by the partition wall of the air-conditioning case 110, and the rear seat face vent 115 is completely closed with no gap.

Figure 11:
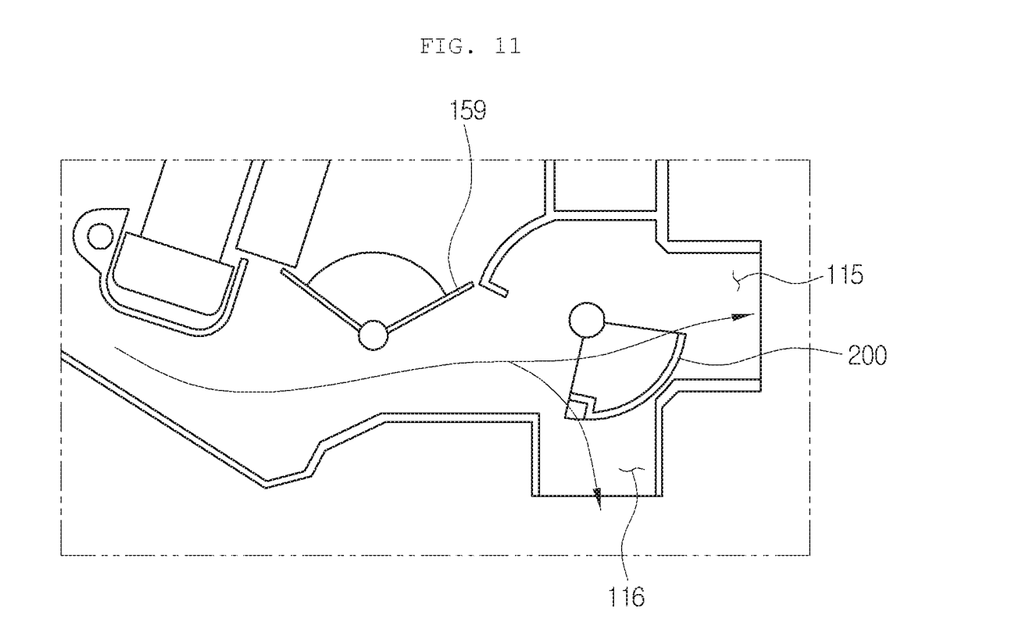
FIG. 11 is a view showing a rear seat bi-level mode of the air conditioner for a vehicle according to the preferred embodiment of the present invention.

FIG. 11 is a view showing a rear seat bi-level mode of the air conditioner for a vehicle according to the preferred embodiment of the present invention.

Referring to FIG. 11, as shown in FIG. 10, the front seat may be in a front seat floor mode or in the bi-level mode that the front seat face vent 113 is opened partially. Some of the air passing the evaporator 120 flows to the warm air passageway P2 and passes the heater core 130 and the electric heater 140. After that, the air passes the communication path between the warm air passageway P2 and the rear seat cold air passageway P3, and then, flows to the rear seat air passageway. The other air passing the evaporator 120 is mixed with heated air passing the warm air passageway P2 through the rear seat cold air passageway P3. The mixed air is discharged to the rear seat face vent 115 and the rear seat floor vent 116.

The first rear seat temp door 172 opens the warm air passageway P2, and the second rear seat temp door 159 is located midway to open all of the rear seat cold air passageway P3 and the communication path between the warm air passageway P2 and the rear seat cold air passageway P3 and adjusts temperature. Furthermore, the rear seat mode door 200 is located midway between the rear seat face vent 115 and the rear seat floor vent 116 to realize the bi-level mode.

Figure 12:
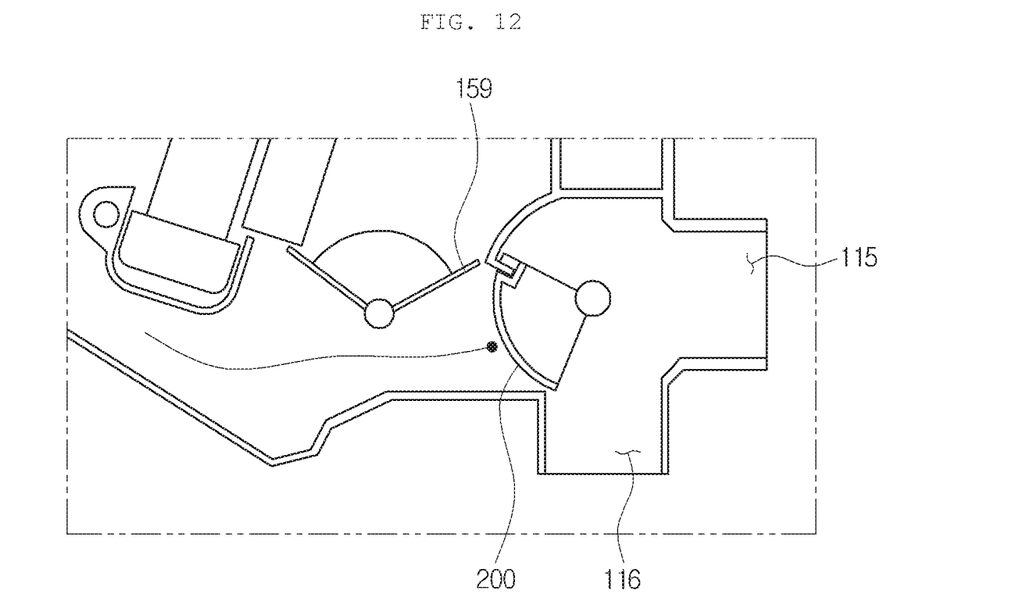
FIG. 12 is a view showing a rear seat close mode of the air conditioner for a vehicle according to the preferred embodiment of the present invention.

FIG. 12 is a view showing a rear seat close mode of the air conditioner for a vehicle according to the preferred embodiment of the present invention.

Referring to FIG. 12, the air passing the evaporator 120 flows to the warm air passageway P2 and passes the heater core 130 and the electric heater 140, and then, is discharged to the front seat floor vent 114. The rear seat closing mode may be the maximum heating mode of the front seat or the mixing mode. The rear seat mode door 200 closes the rear seat air passageway.

In this instance, the stepped portion 230 and the other end portion 242 of the rear seat mode door 200 are stopped by the partition wall of the air-conditioning case 110, and the communication hole 1102 is completely closed with no gap.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle which includes an air-conditioning case having an air passageway formed therein, and a heat exchanger for cooling and a heat exchanger for heating which are disposed in the air passageway of the air-conditioning case to exchange heat with air passing the air passageway, the air conditioner comprising:
    a front seat temp door for adjusting the degree of opening between a front seat cold air passageway and a part of a warm air passageway;
    a first rear seat temp door arranged between the heat exchanger for cooling and the heat exchanger for heating to adjust the degree of opening of another part of the warm air passageway; and
    a rear seat mode door for adjusting the degree of opening of a rear seat air outlet,
    wherein the rear seat mode door has a rear seat closing function to close an air flow to a rear seat air outlet,
    wherein the rear seat mode door has a stepped portion formed at an end portion,
    wherein the rear seat mode door is a dome-shaped door and the air-conditioning case has a protrusion portion corresponding to the stepped portion, so as to perform a bleeding function through a gap formed between the protrusion portion and the stepped portion,
    wherein the protrusion portion passes the stepped portion of the rear seat mode door to make rotation of the rear seat mode door free, and is caught to another end portion of the opposite side of the stepped portion of the rear seat mode door to restrict the rotation of the rear seat mode door, and
    wherein in a rear seat vent mode, the other end portion of the stepped portion gets in contact with the air-conditioning case to be sealed, and the end portion where the stepped portion is formed is located on the protrusion portion to form the gap between the protrusion portion and the stepped portion.

2. The air conditioner according to claim 1, wherein the stepped portion extends from both sides of the rear seat mode door in an axial direction to a predetermined length.

3. The air conditioner according to claim 1, further comprising:
    a second rear seat temp door arranged downstream of the heat exchanger for heating to adjust the degree of opening between the warm air passageway and a rear seat cold air passageway,
    wherein the rear seat mode door is arranged downstream of the second rear seat temp door.

4. The air conditioner according to claim 3, wherein in the rear seat vent mode, the rear seat mode door bleeds some of the air through a rear seat floor vent.

5. The air conditioner according to claim 4, wherein the rear seat cold air passageway communicates with the rear seat floor vent and a rear seat face vent through a communication hole, and the communication hole, the rear seat floor vent and the rear seat face vent are formed in the air-conditioning case in order along a rotational radius of the rear seat mode door, and wherein the protrusion portion is formed at a lower portion of the communication hole.

6. The air conditioner according to claim 1, wherein in a rear seat floor mode or in a rear seat closing mode, all of the other end portion of the opposite side of the stepped portion and the end portion where the stepped portion is formed get in contact with the air-conditioning case to be sealed.

7. The air conditioner according to claim 1, wherein the rear seat mode door has a rear seat closing function to close the air flow to the rear seat air outlet.

8. The air conditioner according to claim 1, wherein in a rear seat off mode, the stepped portion of the rear seat mode door faces an upper sealing surface of the air-conditioning case and closes a space between the air-conditioning case and the stepped portion.

9. An air conditioner for a vehicle which includes an air-conditioning case having an air passageway formed therein, and a heat exchanger for cooling and a heat exchanger for heating which are disposed in the air passageway of the air-conditioning case to exchange heat with air passing the air passageway, the air conditioner comprising:

a front seat temp door for adjusting the degree of opening between a front seat cold air passageway and a part of a warm air passageway;

a first rear seat temp door arranged between the heat exchanger for cooling and the heat exchanger for heating to adjust the degree of opening of another part of the warm air passageway; and a rear seat mode door for adjusting the degree of opening of a rear seat air outlet, wherein the rear seat mode door has a rear seat closing function to close an air flow to a rear seat air outlet, and wherein the rear seat mode door has a bypass part to bleed some air;

wherein the rear seat mode door has a stepped portion formed at an end portion;

wherein in a rear seat off mode, the stepped portion of the rear seat mode door faces an upper sealing surface of the air-conditioning case and closes a space between the air-conditioning case and the stepped portion.

\* \* \* \* \*